United States Patent [19]

Gerlowski et al.

[11] Patent Number: 4,996,086

[45] Date of Patent: Feb. 26, 1991

[54] METHOD FOR THE FABRICATION OF A MULTI-OVENABLE, RETORTABLE CONTAINER APPARATUS

[75] Inventors: Leonard E. Gerlowski; John R. Kastelic, both of Katy; William H. Korcz, Houston, all of Tex.

[73] Assignee: Shell Oil Company, Houston, Tex.

[21] Appl. No.: 488,930

[22] Filed: Mar. 5, 1990

[51] Int. Cl.$^5$ .......................... B05D 1/18; B05D 1/02
[52] U.S. Cl. .................................... 427/421; 264/129; 428/36.6; 427/430.1
[58] Field of Search .................... 264/129; 427/393.5, 427/430.1, 421; 428/36.6

[56] References Cited

U.S. PATENT DOCUMENTS

| | | | |
|---|---|---|---|
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,984,388 | 10/1976 | Shryne et al. | 260/63 |
| 4,076,911 | 2/1978 | Fenton | 526/11.1 |
| 4,081,646 | 3/1978 | Goltsos | 219/10.55 |
| 4,351,997 | 9/1982 | Mattisson et al. | 219/10.55 |
| 4,473,482 | 9/1984 | Serres et al. | 252/52 R |
| 4,486,378 | 12/1984 | Hirata et al. | 264/512 |
| 4,515,836 | 5/1985 | Cobbs, Jr. et al. | 427/425 |
| 4,573,429 | 3/1986 | Cobbs, Jr. et al. | 118/322 |
| 4,606,942 | 8/1986 | Shriver et al. | 427/233 |
| 4,635,585 | 1/1987 | Conrad et al. | 118/316 |
| 4,714,580 | 12/1987 | Maruhashi et al. | 264/516 |

FOREIGN PATENT DOCUMENTS 121965 of 1984 European Pat. Off. .
181014 of 1985 European Pat. Off. .
1081304 of 1967 United Kingdom .

*Primary Examiner*—Michael Lusignan

[57] ABSTRACT

This invention discloses a method of fabrication of a shelf stable, dimensionally heat stable, impact resistant, retortable, hot fillable container apparatus which is suitable for oven use. The container apparatus has a shaped first material layer formed from a linear alternating polymer of carbon monoxide, ethylene and propylene, and a cooperatively shaped second material layer formed by coating a copolymer of vinylidene chloride material on at least one untreated side of the first material layer, preferably by impact spraying. The thicknesses of the material layers are selected such that the water percent weight loss per year of any contents stored in the container is less than 3% per year.

5 Claims, No Drawings

METHOD FOR THE FABRICATION OF A MULTI-OVENABLE, RETORTABLE CONTAINER APPARATUS

RELATED APPLICATION

This application is related to co-pending application Ser. No. 07/489,135, entitled "Multi-ovenable, Retortable, Container Apparatus", L. E. Gerlowski, J. A. Kastelic, and W. H. Korcz inventors, filed Mar. 5, 1990.

FIELD OF THE INVENTION

This invention relates to the method of fabrication of a food container which may be used for heating or cooking of food in hot air, convection, household and microwave ovens, as well as in retort sterilization or hot filling processes. More particularly, this invention relates to the fabrication of a shelf-stable, dimensionally heat stable container which is made of a polyketone polymer that has been suitably coated with a copolymer of vinylidene chloride, hereinafter referred to as PVDC.

BACKGROUND OF THE INVENTION

With the advent of the use of microwave ovens in addition to conventional ovens, has come the need for packages which are multi-ovenable and which also possess many characteristics as well. The metallic packages used for "TV dinners" in years past are not satisfactory as multi-ovenable packages, since the metallic packages are opaque to microwave radiation and result in uneven distribution of heat to the food and may even result in damage to the microwave oven. Thus, metallic trays have been replaced by polymeric trays in possible multi-oven applications. Packages or trays are also known which are made of a material transparent to microwave energy. See for example, U.S. Pat. No. 4,081,646.

In addition, U.S. Pat. No. 4,351,997 discloses the use of a plastic material for the package to accomplish even heat distribution to the food within a single compartment or tray in a microwave oven.

Multilayer polymeric containers are quite common.

Containers of paperboard or plastics such as (1) amorphous nylon, (2) polypropylene, (3) polyethylene terephthalate (PET), (4) crystalline PET (CPET), and (5) polycarbonate are known, but each plastic has inherent disadvantages as an oven-usable packaging container.

(1) Amorphous nylon, for example, has low gaseous and water permeabilities, which is advantageous, but a container made of amorphous nylon requires a minimum of a three (3) layer structure since the heat distortion temperature (HDT) is moderate. One or more layers of a higher heat distortion material would have to be bonded with adhesive layers, to stiffen the structure. A scrap regrind layer may be included. Also, the processing steps required to process amorphous nylon into a container are twofold: (a) sheet coextrusion followed by (b) forming near melting, in the case of trays. Deeper containers are made by extrusion, blow molding or injection blow molding. The resulting container may be subjected to hot filling (the process where the container is filled with a hot liquid and then sealed while the liquid is hot), however, the container made of solely amorphous nylon is not multi-ovenable, nor is it dimensionally heat stable upon retorting.

(2) Polypropylene has extremely high $O_2$ and $CO_2$ gaseous permeabilities, (although its water permeability is very low), making it unsuitable, alone, as a shelf stable, oxygen barrier, food package. Therefore, polypropylene containing food packages generally have a minimum of four layers. Additional layers include an oxygen barrier layer, an adhesive layer, and a regrind layer to accommodate scrap generated in the forming processes which is reused in the structure. Most commerically used containers (trays, bowls, cups, tubs) start from coextruded, multilayer sheet which is subsequently thermally formed into a shape by use of a continuous web forming line having multiple tool cavities.

Polypropylene based containers are not ovenable: heat distortion resistance is such that significant loss of strength and stiffness have already occured at about 250° F. Polypropylene based packages are, however, microwaveable. Numerous commercial products exist in polypropylene containers for microwave rewarming. However, the consumer is warned on *all* such packages *not* to rewarm contents in a convection oven. Retort sterilization is practiced for food products in polypropylene based containers. However, certain additional processing steps and/or modifications to the basic polypropylene materials and/or container structure must be made in order to allow such containers to survive retort sterilization in the 250° F. to 270° F. range. Examples include the following:

(1) forming of the container at a temperature above the melt temperature of the polypropylene in order to preclude residual stress (thermal memory) within the polypropylene. If this is not practiced, then residual stresses will be relieved during the retort heating, and result in unacceptable dimensional change (distortion of the container);

(2) use of fillers, such as talc, to increase both stiffness at elevated temperatures and to provide added melt strength to the sheet structure in order to allow melt conveyance without appreciable web distortion prior to melt forming;

(3) use of thick walls (40–50 mils) and/or bellows structures to resist and/or accomodate heat and pressure distorting forces acting on the container during retort;

(4) control over pressure during retorting such that the pressure differential, inside the container as compared with the pressure within the retort (external pressure), is minimized during heat up, hold and cool down of the retort.

Our invention, due to a minimum of 28° C. greater heat distortion temperature, and a crystalline melt point of about a minimum of 50° C. greater for the polyketone polymers precludes the need of any such measures for the melt forming, or solid phase pressure forming of polyketone based retortable containers. Thus, melt forming, the use of fillers, thick walls and complicated retorting equipment (ramped temperature and pressure control) are not required, and form the basis for major advantages in fabrication and performance to both the container manufacturer and food processor.

(3) Amorphous, non-crystalline PET (polyethylene terephthalate) and PETG (glycol-modified polyethylene terephthalate) have moderate gaseous permeability and competitive water permeability, but very low HDT's owing to their lack of crystallinity. This low HDT precludes their use in retort or hot fill processes, and neither material is ovenable.

Unsaturated, low molecular weight polyesters can be compounded as pastes with curing agents, then molded and chemically crosslinked to produce thermoset trays with a high HDT. However, a two-step process is required wherein the paste is (1) press molded and then (2) held for a prolonged heat cure interval in a hot mold, resulting in a very slow, multistep process. Contrasted with thermoplastic processing accomplished in a matter of seconds, the thermosetting process takes minutes. Moreover, the thermoset scrap cannot be reused in this process, adding further substantial cost to the molded part and to the consumer. Finally, this approach does not lend itself to inclusion of other layers of material, thus barrier properties are rather poor for these structures.

(4) Crystalline PET (CPET) has low gaseous and water permeabilities, and may be formed into a container with only a monolayer of CPET required. However, the processing steps required are several. In order that the resulting container is multi-ovenable or hot fillable, a third post-forming step is crucial in order to control the degree of crystallization of the polymer to achieve an acceptable HDT and adequate impact resistance. Moreover, the maximum crystallinity allowed for CPET is about 40%. A crystallinity of greater than about 40% results in a brittle container which breaks easily. CPET is dimensionally heat stable after retort if crystallization extent is above 30%. However, the retort process temperatures will cause additional crystallization to occur in CPET rendering the container *brittle*.

(5) Polycarbonate has high gaseous permeability, making it unsuitable, alone, as a shelf stable package. A polycarbonate container requires a minimum of a four (4) layer structure because of the high permeability and moderate HDT of polycarbonate. A two step forming process is required and the resulting container is multi-ovenable.

There is therefore a need for a method of fabrication of a thermoplastic polymer container apparatus, from which a food or beverage container can be made which is multi-ovenable, hot fillable, retortable, and rigid but not brittle.

SUMMARY OF THE INVENTION

The invention comprises the formation of a shelf stable, dimensionally heat stable, impact resistant, retortable, hot fillable container apparatus which is suitable for oven use. The container has a shaped first material layer formed from CARILON ® thermoplastic polymer which is a linear alternating polymer of carbon monoxide and at least one ethylenically unsaturated hydrocarbon.

The container apparatus also includes a cooperatively-shaped second material layer formed by deposition, preferably impact spraying, of a copolymer of vinylidene chloride (PVDC) material on at least one untreated side of the first material layer. The thickness of the layers are selected such that the water percent weight loss per year of any content stored in the container is less than 3% per year.

CARILON polymer has very good $O_2$ and $CO_2$ barrier properties, and is positioned adjacent the PVDC water barrier layer to yield a structure having excellent water and gas barrier properties.

An advantage of this method of fabrication is that even with a significant number of pinholes in the PVDC material used to coat the CARILON polymer layer, there are no gas permeability problems since the CARILON polymer material forms the gas barrier. Conversely, pinholes in a PVDC layer used to coat a polypropylene layer would cause an unacceptable amount of oxygen to pass through the polypropylene layer, since the polypropylene layer is pervious to the oxygen.

Additionally, in the CARILON polymer/PVDC system when the thickness of the PVDC layer is increased a small amount, the thickness of the CARILON polymer layer can be halved, significantly reducing the amount of solid plastic waste eventually discarded into the environment.

Whereas polypropylene must first be flame treated to insure sufficient adhesion with the PVDC layer, because of CARILON polymer's superior adhesive properties no flame treatment of the CARILON polymer surface is necessary prior to bonding with the PVDC layer.

These and other advantages of the present invention will become apparent from the following detailed description, wherein reference is made to the FIGS. in the accompanying drawings.

IN THE DRAWINGS

FIG. 1 is a schematic representation in cross section of a side view of a container.

FIG. 2 is a graphical representation of Water Percent Weight Loss per Year vs. PVDC Coating Thickness.

DETAILED DESCRIPTION OF THE INVENTION

For purposes of clarity the following Description is divided into the following sections.

Section A. Polyketone polymer properties and container fabrication methods.

Section B. PVDC properties and application to containers.

Section C. Illustrative Embodiments

A. POLYKETONE POLYMER PROPERTIES AND CONTAINER FABRICATION METHODS

The shaped first material layer (FIG. 1) of the container of this invention is formed from CARILON thermoplastic polymer, which is a linear alternating polymer of carbon monoxide and at least one ethylenically unsaturated hydrocarbon.

The linear alternating polymers, now becoming known as polyketones or polyketone polymers, have a repeating unit of the general formula —CO—(—A—)— wherein A is the moiety of ethylenically unsaturated hydrocarbon polymerized through the ethylenic linkage. A variety of ethylenically unsaturated hydrocarbons of up to 20 carbon atoms inclusive, preferably up to 10 carbon atoms inclusive, are useful in the production of the linear alternating polymers. Illustrative of such hydrocarbons are ethylene, propylene, 1-butene, isobutylene, styrene, 1-octene and 1-dodecene. The preferred linear alternating polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The preferred polyketone polymers for use as a component in the blends of the invention are represented by the repeating formula

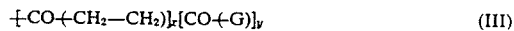　　(III)

wherein G is a moiety of the second ethylenically unsaturated hydrocarbon of at least 3 carbon atoms, particularly propylene, polymerized through the ethylenic unsaturation thereof. The —CO—(—CH$_2$CH$_2$—)— units and —CO—(—G—)— units when present are found randomly throughout the polymer chain and the ratio of y:x is no more than about 0.5. In the embodiment where linear alternating copolymers are employed as the blend component, there will be no second hydrocarbon present and the copolymers are represented by the above formula III wherein y is zero. When terpolymers are employed in the blends of the invention, the terpolymers are of the above formula III wherein y is greater than zero and the ratio of y:x is preferably from about 0.01 to about 0.1.

The preferred polyketone polymers will typically have a number average molecular weight, as determined by gel permeation chromatography, of from about 1000 to about 200,000, but more often from about 20,000 to about 90,000. The polymers have a melting point from about 175° C. to about 300° C. and a limiting viscosity number (LVN), measured in m-cresol at 60° C. in a standard capillary viscosity measuring device, of from about 0.8 dl/g to about 4 dl/g. The linear alternating polymers are produced by contacting the carbon monoxide and ethylenically unsaturated hydrocarbon in the presence of a catalyst composition formed from a compound of palladium, cobalt or nickel, the anion of a non-hydrohalogenic acid having a pKa less than about 6, preferably below 2, and a bidentate ligand of phosphorus, arsenic or antimony. The scope of the polymerization is extensive but, without wishing to be limited, a preferred catalyst composition is formed from a palladium alkanoate, particularly palladium acetate, the anion of trifluoroacetic acid or p-toluenesulfonic acid and a bidentate phosphorus ligand selected from 1,3-bis(diphenylphosphino)propane or 1,3-bis[di(2-methoxyphenyl)phosphino]propane. The general processes for polyketone production are illustrated by a number of published European patent applications Nos. including 121,965, 181,014, 213,671 and 257,663.

The preferred CARILON polymer linear alternating polyketones for use in the invention are linear alternating polymers of carbon monoxide, ethylene and propylene. The propylene content should be less than about 7.0% by weight of the polyketone for a good heat distortion temperature, and preferably from about 1% to about 4% by weight of the polyketone.

Transparency of the polyketone may be increased by imposing orientation during fabrication. This may be done by stretching polyketone sheet at or just below melting as is common practice in solid phase pressure forming. A nominal 4X thickness reduction, such as accomplished in a 2X by 2X draw, is adequate for achievement of good clarity. The draw may exceed this level but only slightly better clarity is achieved. The draw does not have to be balanced.

Polyketone may be thin wall injection molded very quickly and in one step. Thin wall injection molding is very useful for making "deluxe" type, precision containers which have high aesthetic appeal. Crystalline polyethylene terphthalate (CPET) cannot easily be thinwall injection molded because its crystallinity must be controlled to be no more than about 40%, or brittle containers result. Furthermore, crystallinity must be developed and controlled in CPET so that at least 30% is achieved so that these containers have heat distortion resistance.

Crystallization of polyketone occurs rapidly, and unlike CPET, the maximum percent crystallinity in the polyketone is readily achieved which results in optimum barrier properties. This important advantage eliminates any need for post forming heat treatment for annealing at elevated temperatures as practiced for CPET. For best possible oxygen barrier performance, it is advantageous to use a mold heated to over 180° F. and a high packing force during molding. This results in higher levels of crystallinity and optimum barrier performance but does not unduly prolong the molding cycle.

Alternatively, instead of formation of the first material layer by injection molding a polyketone sheet may be rapidly formed into a tray, cup, bowl, tub, etc., by any thermoforming technique such as solid phase pressure forming or solid phase stretch forming. Injection molding, however, allows more detail and functionality to be designed into the container than is achievable in formed sheet.

Table 1 compares the packaging plastics characteristics in terms of layers required, processing steps, and applications for the plastics.

TABLE 1

| MAJOR POLYMERIC COMPONENT IN STRUCTURE | LAYERS REQUIRED | OTHER[1] LAYER FUNCTIONS NOT PROVIDED BY MAJOR POLYMER COMPONENT | PROCESSING STEPS REQUIRED | | | | APPLICATIONS |
|---|---|---|---|---|---|---|---|
| | | | TOTAL | PRIMARY | SECONDARY | POST FORMING TREATMENT | |
| 1. Polyester (Thermoplastic, Crystallizable: (CPET) | One; Monolayer | — | 3 2 | Extrude Injection | Thermoform — | Crystallize/Anneal[2] Heat Set[2] | Dual Ovenable Structure Hot Fill Btls/Jars |
| 2. Copolyester (Thermoplastic, Amorphous: PETG & CPET) | Two; Multilayer because HDT too low | H | 3 | Coextrude | Thermoform | Crystallize/Anneal[3] | Dual Ovenable Structure (Retort) |
| 3. Unsaturated Polyester (Non-crystalline) | One; Monolayer | — | 2 | Press Mold | — | Heat Cure Slow[4] | Dual Ovenable Structure |
| 4. Polycarbonate | >3; Multilayer because O$_2$ barrier and HDT too low | H, B, A, S | 2 | Coextrude | Thermoform | None | Dual Ovenable Structure (Retort) |
| 5. Polyamide (Amorphous Nylon) | >3; Multilayer because HDT too low | H, A, S | 2 | Coextrude | Melt Form | None | Hot Fill |
| 6. Polypropylene | >3; Multilayer because O$_2$ | H, B, A, S | 2 | Coextrude | Thermoform[5] | None (Flame treat) | Microwave, (Retort) |

TABLE 1-continued

| MAJOR POLYMERIC COMPONENT IN STRUCTURE | LAYERS REQUIRED | OTHER[1] LAYER FUNCTIONS NOT PROVIDED BY MAJOR POLYMER COMPONENT | PROCESSING STEPS REQUIRED | | | POST FORMING TREATMENT | APPLICATIONS |
|---|---|---|---|---|---|---|---|
| | | | TOTAL | PRIMARY | SECONDARY | | |
| 7. Polyketone | Two; multilayer because H₂O barrier too low | barrier is too low W | 3 | Extrude | Thermoform | Spray/coat H₂O barrier | Dual Ovenable Structure, (Retort) |
| | | | 2 | Injection Mold | — | Spray/coat H₂O barrier | Dual Ovenable/ Hot Fill Structures, (Retort) |

[1]W = H₂O Barrier Resistance Material
H = Heat distortion resistance material
B = O₂ barrier resistance material
A = Adhesives between layers
S = Scrap regrind
[2]This post-forming treatment is crucial and necessary to control degree of crystallization to achieve acceptable heat distortion resistance.
[3]Coextruded with CPET which requires annealing/crystallization step.
[4]Resin system must be cured in a hot mold, 2 minutes to make.
[5]Melt phase forming required to assure absence of residual thermal stress which would cause distortion in retorting.

The shaped first material layer of the container preferably comprises a tray, cup, bowl, or tub, which includes a thin bottom wall and a peripheral structure, wherein the peripheral structure includes a thin peripheral wall extending upwardly from the bottom wall and a rim extending outwardly from the peripheral wall at the top. By "thin wall" is meant a wall thickness of no more than 50 mils. Preferably, these walls are from about 5 and 45 mils thick and most preferably from about 10 and 30 mils thick. The thin walls may be easily accomplished by the use of a thin wall injection molding technique or thermoforming methods, including melt forming, melt blowing, and solid phase pressure forming. A thin wall package may be desired. By "thin wall package" it is meant that at least the bottom wall and optionally the peripheral wall extending upward from the bottom wall have thin walls.

The first material layer, after it has been spray/coated with a layer of PVDC as described in Section B, forms a shelf stable container, i.e. the package and its contents remain substantially the same without any undesirable changes due to $O_2$ diffusion into the container on $H_2O$ diffusion out of the container during shelf storage.

The container is also dimensionally heat stable, in that it can withstand convection oven temperatures of up to about 450° F. This is well within rewarming temperatures of 350° F. normally specified for CPET type trays, and provides a margin of safety to fluctuations found in most convection ovens. When the container is subjected to a standard "retort" test by autoclaving in steam at 275° F. for 30 minutes, the container substantially retains all original dimensions without significant undesirable buckling, wrinkling or distortion. Thus, it may be used for sterilization processing of foods or liquids. The container may also be used in hot air, convection, household or microwave ovens and withstand boiling temperatures, for example, as in a hot filling process, without significant buckling, distortion or cracking.

The container should be rigid, owing to a high modulus but without significant brittleness. If the container tray is brittle, it is likely to break easily when dropped or impacted, as well as exhibit unsightly cracks.

Table 2 compares the properties of polyketones vs. other packaging plastics, as follows:

TABLE 2

| COMPARISON OF PROPERTIES OF POLYKETONES VS. OTHER PACKAGING PLASTICS | | | | | | |
|---|---|---|---|---|---|---|
| Permeability: | Amorphous Nylon | Polypropylene | Amorphous PET or PETG | Crystalline PET | Polycarbonate | Polyketone |
| cc-mil/100 sq. in-day-atm | | | | | | |
| $O_2$: | ~1–5 | 300 | 8–25 | 2.3–5 | 200–250 | .4–5 |
| $CO_2$: | 10 | 800 | 20–76 | ~10–15 | >300 | 15–28 |
| gm-mil/100 sq. $H_2O$: in-day | 15–20 | 0.53 | 5–7 | 1.2–2.0 | 3–10 | 3–12 |
| modulus @ 300° F. | high | low | distorts | adequate unfilled | adequate unfilled | adequate unfilled |
| low temp Impact Notched Izod @ 40° F. | good | low | good | adequate | good | adequate |
| Min. wall thickness for adequate $O_2$ barrier, mils | 10–20 | needs barrier | 20–100 | 10–20 | needs barrier | 10–20 |
| Dual Oven Forming Cycle | not possible | not possible | not possible | slow and high tool cost | fast | fast |
| Thin wall injection molding | fair | good | poor | not possible | not recommended | good |
| Melt viscosity | low | high | medium | low-medium | medium-high | high |
| Melt strength | low | medium | medium | medium | low-medium | high |
| Extrudability | poor | good | medium | good | medium | very good |

TABLE 2-continued
COMPARISON OF PROPERTIES OF POLYKETONES VS. OTHER PACKAGING PLASTICS

| Permeability: | Amorphous Nylon | Polypropylene | Amorphous PET or PETG | Crystalline PET | Polycarbonate | Polyketone |
|---|---|---|---|---|---|---|
| Crystallization rate | none (amorphous) | high | none (amorphous) | low | none (amorphous) | high |
| Molding Cycle time | medium | fast | slow | very slow | medium | very fast |
| Extrusion Blow Molding | poor | good | fair | poor | good | good |
| Heat Distortion Temperature achievable, °C. (ASTM D648, 264 psi) | 120 | 57 (homopolymer) | 63 | 85 | 127 | 85-200 (C3 up to about 7% by weight) |

B. PVDC PROPERTIES AND APPLICATION TO CONTAINERS

The material used in making the shaped second material layer of the container of this invention is preferably a water barrier coating of a copolymer of vinylidene chloride, commonly called PVDC.

As disclosed in U.S. Pat. No. 4,486,378, a plastic bottle may have as a wall-forming component a layer of PVDC, the PVDC having an oxygen permeability constant of less that $9 \times 10^{-14}$ cc-cm/cm$^2$-sec-cm Hg as measured at a temperature 20° C. and a relative humidity of 100%, and a water vapor permeability constant of less than $3 \times 10^{-3}$ gm-cm/m$^2$-day as determined according to the test method of JIS Z-0208.

As disclosed in the '378 patent, a plastic bottle may be fabricated by casting an aqueous latex or the like of the above-mentioned PVDC copolymer on the inside surface of a bottle and thereafter allowing the cast latex to dry. This aqueous latex may also be formed as a coating layer on the outside surface of the bottle. In the bottle of the '378 patent the humidity dependency of the oxygen barrier property is predominantly reduced.

In U.S. Pat. No. 4,714,580, same assignee, an aqueous latex of PVDC is coated on at least one surface of a parisan, preform, or sheet, the sheet being composed of a molecularly orientable thermoplastic resin. The coated latex drys to form a coated sheet which is thereafter subjected to a draw molding operation, to draw-form the coated sheet into a shaped container.

U.S. Pat. Nos. 4,515,836 and 4,573,429 assigned to the Nordson Corporation set forth the process and apparatus respectively for impact spraying of the PVDC onto a preformed thermoplastic container. The process requires locating the container in close proximity to one or more airless spray nozzles and impacting the outside surface of the container with a stream of stabilized aqueous polymer dispersion such as an aqueous PVDC dispersion. The resulting wet coating does not sag or run off. The coating on the container is then dried in a controlled atmosphere to complete gel formation throughout its thickness whereupon it is further dried to remove the water from the coating and to collapse the gel to form a film without distorting the container. The dried coating is smooth, uniform and uniformly transparent.

U.S. Pat. No. 4,635,585, assigned also to Nordson Corporation, again teaches the spray application of PVDC to a web.

U.S. Pat. No. 4,606,942 assigned to Adolph Coors Company discloses an apparatus including a spraying assembly for moving a nozzle body into and out of the interior cavity of a bottle while the bottle rotates about its central longitudinal axis. A spraying control system causes a predetermined amount of coating material to be dispensed to selected regions of the bottle as a function of the nozzle body linear displacement relative the body.

In summary, the PVDC layer may be applied to the shaped polyketone layer by one of several methods. As discussed in the following section, it was determined that impact spraying was the preferred method of application of the PVDC layer to the polyketone layer.

C. ILLUSTRATIVE EMBODIMENTS

It should be noted that one major drawback of PVDC coatings is their instability at moderate temperatures. PVDC darkens (or yellows), decomposes and emits HCL at temperatures near retort conditions. In order to determine the best PVDC copolymer to be coated on the polyketone container layer, PVDC copolymers from different suppliers were evaluated which were considered to be able to withstand some degree of heat history.

PVDC coatings from Dow Chemical Company, W. R. Grace Company and ICI were evaluated in solvent and latex based applications. All surfaces were IPA washed and corona treated to provide maximum adhesion, though in an alternative embodiment it should be well recognized that the corona treatment would not be necessary.

Solution coating work consisted of 20% wt and 5% wt solutions of Dow's Saran Resin F120 and F220 prepared in 65/35 w/w mixtures of THF(tetrahydrofuran)-/Toluene. Cups were dipped in solution and then attached to an air motor to rotate slowly in a single bank of infrared lamps (120° to 140° F.). To avoid coating inconsistency problems, only 5% weight solutions were successfully used. Multiple coats were required to obtain the desired coating weight of 9 mg/sq in., (Table 3).

TABLE 3
PVDC Weight of Coated Containers

| Application Technique | Special Notes | Polymer (PVDC) | Coating Weight (mg/in$^2$) |
|---|---|---|---|
| Nordson Impact Spray | 300 psig (driving pressure) | VICLAN 834 | 11.0 |
| Nordson Impact Spray | 600 psig | DARAN 8680 | 17.0 |
| Nordson Impact Spray | 300 psig + IPA + DI water | VICLAN 834 | 9.5 |
| Solvent Dipped | 20% w | SARAN 120 | 42.0 |
| Solvent Dipped | 20% w | SARAN 220 | 28.0 |
| Solvent | 5% w | SARAN 120 | 1.7 |

TABLE 3-continued

PVDC Weight of Coated Containers

| Application Technique | Special Notes | Polymer (PVDC) | Coating Weight (mg/in$^2$) |
|---|---|---|---|
| Dipped Solvent | single coat 5% w | SARAN 220 | 1.2 |
| Dipped Solvent | single coat 5% w | SARAN 120 | 12.4 |
| Dipped Solvent | 5 coats 5% w | SARAN 220 | 11.5 |
| Dipped Solvent | 5 coats 5% w | SARAN 220 | |
| Sprayed | 1 coat | | 2.7 |
| | 2 coat | | 4.3 |
| | 3 coat | | 5.6 |
| | 4 coat | | 9.5 |

The Nordson impact spraying system was used to apply latex PVDC. To apply the coating, the neat polyketone container (first material layer) was placed on a horizontal rotating mandrel. The rotational speed of the mandrel and the spray duration were timed so as to insure one complete coat with minimal overlap of coating. In the currently preferred configuration, one spray gun was positioned to spray the bottom of the container, and a second spray gun was positioned to spray the sidewall. The nozzles of the spray gun sprayed a thin, 90° fan which was configured horizontally, although it could have been rotated to any desired angle. The amount of coating applied to the polyketone container layer was controlled by the container position and the spray fan and driving pressure (flow rate). Typical spray pressures were from 300 to 800 psig. Once sprayed, the mandrel was removed from the spraying cabinet and attached to an air motor. The container was then rotated between two banks of infrared lamps (120° to 140° F.) to dry for 2 to 5 minutes.

The emulsion and impact sprayed coated containers were then evaluated for water and oxygen permeability before and after being subjected to retort conditions. The results are summarized in Table 4.

TABLE 4

Oxygen and Water Vapor Transmission of PVDC Coated CARILON ® Thermoplastic Containers
PVDC COATING SUMMARY

| | APPLICATION | BEFORE RETORT | | AFTER RETORT | | NOTES (AFTER RETORT) |
|---|---|---|---|---|---|---|
| | | PO2 | WVTR | PO2 | WVTR | |
| DOW 120 | SOLVENT | 0.001 | 0.010 | 0.001 | 0.010 | BROWNS |
| DOW 220 | SOLVENT | 0.001 | 0.010 | 0.001 | 0.030 | BROWNS BUBBLES |
| WR GRACE DARAN | LATEX DIP IMPACT SPRAY | 0.001 | 0.010 | 0.001 | 0.040 | NO ADHESION PH 3 OR PH7 YELLOW |
| ICI VICLAN 834 | LATEX DIP IMPACT SPRAY* | — 0.0015 | 0.010 0.006 | — 0.0013 | 0.002 0.002 | PH 3 OR PH7 GOOD ADHESION |
| TARGET | | 0.002 | 0.010 | 0.002 | 0.010 | |

(UNITS: PO2 CC/CONTAINER-DAY, WVTR GM/CONTAINER DAY)
*(BEST COATING/ADHESION RESULTS WITH IMPACT SPRAY OF VICLAN)

The oxygen permeability was measured on the MOCON Oxtran oxygen analyzer and a value of 0.002 cc/container-day was the target value. Water transmission was measured gravimetrically and a value of 0.01 gm/container day was the target value (corresponding to 3% wt loss per year). Adhesion was measured with a standard crosshatched "scotch tape" test. The solvent based PVDC layers were able to meet the adhesion requirements; however, excessive yellowing appears to limit the barrier. The DARAN 8680 coatings supplied by W. R. Grace did not adhere to the container following retort, and hence barrier properties are not reported, (barrier properties are essentially equal to the uncoated container after retorting). The ICI Viclan 834 was able to meet all requirements with only a very slight yellowing following retort.

In a preferred embodiment of the practice of the invention, the Viclan 834 material would be impact sprayed onto a polyketone container layer. As shown in FIG. 2 with an increase in thickness of the Viclan layer of approximately 0.1 mil over the 0.4 mil necessary for a 20 mil container, a 10 mil polyketone container layer can meet the barrier requirements of less than 3% water percent weight loss per year. In other words, the required thickness of the first material layer of polyketone may be halved by increasing the thickness of the second layer of PVDC from about 15 to about 30%.

Table 5 summarizes comparative heat processing, heat resistance, and barrier properties for the previously discussed materials.

TABLE 5

COMPARATIVE HEAT PROCESSING, HEAT RESISTANCE AND BARRIER PROPERTIES FOR CONTAINER MATERIALS AND STRUCTURES

| Material | Structure | Special Heat Processing | Heat Resistance | | | | Barrier Properties | |
|---|---|---|---|---|---|---|---|---|
| | | | Microwave Rewarming (150-212° F.) | Hot Filling (190-220° F.) | Retort Sterilization (250-270° F.) | Convection Oven Rewarming (350° F. +) | Water | Oxygen |
| Nylon (amorphous) | monolayer | No | OK | OK | Fails | Fails | Fair | Good |
| Polypropylene (neat homopolymer) | monolayer | No | OK | OK | Fails | Fails | Exc. | Poor |
| Polypropylene component | multilayer | No | OK | OK | Fails | Melts | VG | VG |
| Polypropylene | multilayer | Yes[1] | OK | OK | Fair | Melts | VG | VG |

TABLE 5-continued
COMPARATIVE HEAT PROCESSING, HEAT RESISTANCE AND BARRIER PROPERTIES FOR CONTAINER MATERIALS AND STRUCTURES

| Material | Structure | Special Heat Processing | Heat Resistance | | | | Barrier Properties | |
|---|---|---|---|---|---|---|---|---|
| | | | Microwave Rewarming (150–212° F.) | Hot Filling (190–220° F.) | Retort Sterilization (250–270° F.) | Convection Oven Rewarming (350° F. +) | Water | Oxygen |
| component | | | | | | | | |
| Polycarbonate | monolayer | No | OK | OK | OK | Fails | Poor | Poor |
| PETG or amorphous PET | monolayer | No | OK | Fails | Fails | Fails | Fair | Fair |
| CPET | monolayer | Yes[2] | OK | OK | OK | Good | Fair | Good |
| Polyketone | monolayer | No | OK | OK | OK | Good | Poor | Good |
| Polyketone | PVDC coated | No | OK | OK | OK | Good | Good | VG |

[1] Melt forming of container above polypropylene melting temperature
[2] Controlled crystallization on heated forming tool Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A process for the formation of a shelf stable, dimensionally heat stable, impact resistant, retortable, hot fillable container which is suitable for oven use, said process comprising the steps of:

providing a shaped first material layer having a first thickness formed from a linear alternating polymer of carbon monoxide, ethylene and propylene, which has the empirical formula, $$[C-CH_2-CH_2]_x-[C-C_3H_6]_y;$$

and coating a copolymer of vinylidene chloride material on at least one side of said first material layer to form a cooperatively-shaped second material layer having a second thickness; wherein the first thickness of said first material layer and the second thickness of said second material layer are selected such that the water percent weight loss per year of any contents stored in said container is less than 3% per year.

2. The process of claim 1 wherein the step of providing a shaped first material layer is done by solid phase pressure forming said layer.

3. The process of claim 1 wherein the step of providing a shaped first material layer is done by injection molding said layer.

4. The process of claim 1 wherein the step of coating said copolymer on at least one untreated side of said first material is done by impact spraying said copolymer on said first material layer.

5. The process of claim 4 wherein the step of coating said copolymer on at least one untreated side of said first material layer is done by immersion of said first material layer within a bath of said copolymer.

* * * * *

UNITED STATES PATENT AND TRADEMARK OFFICE
CERTIFICATE OF CORRECTION

PATENT NO. : 4,996,086

DATED : February 26, 1991

INVENTOR(S) : Leonard E. Gerlowski, et. al.

It is certified that error appears in the above-identified patent and that said Letters Patent is hereby corrected as shown below:

Please add Figure 1 and Figure 2, as shown on the attached page.
Column 4, line 39, after "layer" insert -- 2--.
Column 4, line 40, after "tainer", insert --10--.
Column 7, line 41, after "layer" insert --14--. Column 9, line 19, after "layer", insert --14--.
Column 13, line 36, delete "$[C-CH_2-CH_2]_x-[C-C_3-H_6]_y$", and insert in its place --$[CO-CH_2-CH_2\}_{\overline{x}}-[CO-C_3H_6\}_{\overline{y}}$--.

Signed and Sealed this

Third Day of November, 1992

Attest:

DOUGLAS B. COMER

*Attesting Officer*       *Acting Commissioner of Patents and Trademarks*

UNITED STATES PATENT AND TRADEMARK OFFICE
CERTIFICATE OF CORRECTION

PATENT NO. : 4,996,086

DATED : February 26, 1991

INVENTOR(S) : Leonard E. Gerlowski, et. al.

It is certified that error appears in the above-identified patent and that said Letters Patent is hereby corrected as shown below:

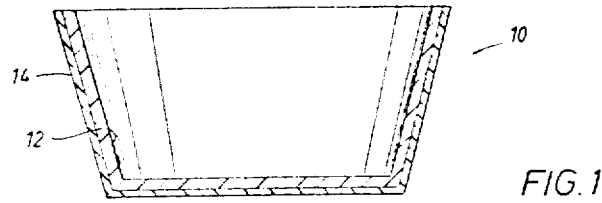

FIG.1

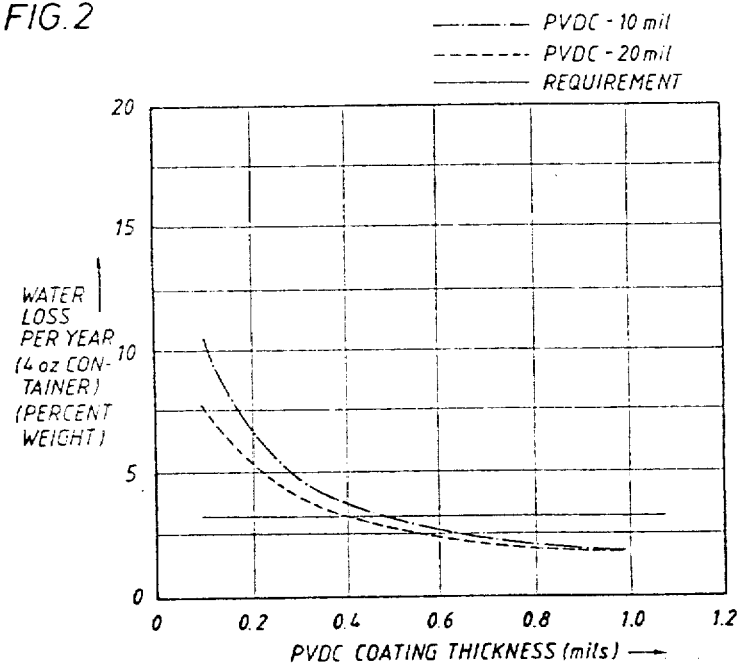

FIG.2